US005756974A

United States Patent [19]

Hong

[11] Patent Number: 5,756,974

[45] Date of Patent: May 26, 1998

[54] CONVECTION MICROWAVE OVEN HAVING IMPROVED HOT AIR CIRCULATION

[75] Inventor: Seok Weon Hong, Suwon, Rep. of Korea

[73] Assignee: Samsung Electronics Co., Ltd., Suwon, Rep. of Korea

[21] Appl. No.: 647,600

[22] Filed: May 13, 1996

[30] Foreign Application Priority Data

| | | | |
|---|---|---|---|
| Jun. 9, 1995 | [KR] | Rep. of Korea | 1995-12978 |
| Jul. 28, 1995 | [KR] | Rep. of Korea | 1995-22902 |
| Oct. 7, 1995 | [KR] | Rep. of Korea | 1995-34455 |

[51] Int. Cl.[6] ................ H05B 6/64; F27D 7/04; A21B 1/26

[52] U.S. Cl. ................ 219/681; 219/757; 219/400; 126/21 A

[58] Field of Search ................ 219/681, 682, 219/683, 684, 757, 400; 126/21 A

[56] References Cited

U.S. PATENT DOCUMENTS

| | | | |
|---|---|---|---|
| 2,862,095 | 11/1958 | Scofield | 219/400 |
| 4,439,459 | 3/1984 | Swartley | 219/400 |
| 4,539,469 | 9/1985 | Gigandet | 219/400 |
| 4,591,683 | 5/1986 | Eke | 219/681 |
| 4,892,093 | 1/1990 | Konig | 219/400 |
| 4,908,488 | 3/1990 | Park et al. | 219/681 |
| 4,940,869 | 7/1990 | Scholtes et al. | 219/681 |
| 5,336,867 | 8/1994 | Miller | 219/400 |
| 5,468,935 | 11/1995 | Wang | 219/400 |

FOREIGN PATENT DOCUMENTS

| | | |
|---|---|---|
| 5-312326 | 11/1993 | Japan . |

*Primary Examiner*—Philip H. Leung

*Attorney, Agent, or Firm*—Burns, Doane, Swecker & Mathis, L.L.P.

[57] ABSTRACT

A convection microwave oven has a high frequency generator for microwave cooking, and an electric heater for convection cooking. The heater is disposed within a cooking chamber at an upper portion thereof. A channel is disposed outside of the cooking chamber and communicates with the cooking chamber through an air inlet and an air outlet formed in vertically spaced relationship in a rear wall of the cooking chamber. A fan is situated within the channel adjacent the air inlet for drawing air from the cooking chamber via the air inlet, and discharging the air back into the cooking chamber via the air outlet. The air outlet is positioned to direct the discharged air toward the electric heater. The cross-sectional area of the channel can become either larger or smaller from the air inlet to the air outlet.

18 Claims, 10 Drawing Sheets

CONVECTION MICROWAVE OVEN HAVING IMPROVED HOT AIR CIRCULATION

BACKGROUND OF THE INVENTION

The invention is related to a connection microwave oven having the convection cooking function of hot air in addition to its inherent microwave function.

A microwave oven is a cooking apparatus utilizing the principle that the molecular motion of foodstuff when applying microwaves having almost 2,450 MHz in frequency causes heat to be released. In a microwave oven, microwaves are radiated from a magnetron and guided into the case. Foodstuffs comprised of molecular particles are charged both positively and negatively, respectively, by the guided microwaves. At the positive pole of the electrical field one end of the molecule is negatively charged, whilst at the negative pole of the electrical field the other end of the molecule is positively charged Since dipoles of an electrical field are changeable by microwaves at 2,450 million per second, molecules of the foodstuff collide with each other, generating heat of collision so as to cook the foodstuff.

In a recent microwave oven, a convection cooking function using radiation heat of a heater has been provided in addition to the microwave function. The grill microwave oven, as shown in FIG. 9, has an electrical heater 92 in the cooking chamber 91. Further, a magnetron 94 is installed in an electrical chamber 93 partitioned from the cooking chamber 91. Thus cooking utilizing microwaves generated from the magnetron can be used as well as utilizing an electrical heater 92. Numeral 95 designates a thermal resistance material for preventing the transfer of heat to the environment.

However, the grill microwave oven has a problem that foodstuff can not be cooked effectively since radiation heat of the electrical heater is unevenly applied to foodstuff placed on the bottom of the cooking chamber. That is, radiation heat emitted from the heater reaches only the upper portion of the foodstuff, resulting in an insufficiently cooked foodstuff.

Further, a microwave oven having the convection heat cooking function in addition to the microwave cooking function is disclosed in Japanese Patent Laid-Open 1993 (JP 5)-312326 as shown FIG. 10. The convection microwave oven is comprised of an inner case 301*a* serving as a cooking chamber 301 and an outer case 306 housing the inner case 301*a*. Various kinds of electrical components are mounted between the inner case 301*a* and the outer case 306. Further, a duct 307*a* forming a hot air chamber 307 is attached to a rear plate 304*a* of the cooking chamber 301. A blowing fan 308 is provided in the hot air chamber 307. A plurality of openings 301*b* are formed in the rear plate 304*a*, through which air circulates between the cooking chamber 301 and the hot air chamber 307. An electrical heater 302 is mounted in the hot air chamber 307. To prevent the transfer of the heat emitted by the heater through the duct 307*a*, toward the rear area, thick thermal resistance material 307*b* is attached to the inner side of the duct 307*a*. A cooling fan is installed coaxially to the blowing fan 308, and a motor 308*b* is mounted for driving both fans 307*a*,308*a*. The duct 307*a*, cooling fan 308*a* and motor 308*b* are covered by a rear plate 306*a* of the outer case 306.

In the convection microwave oven of FIG. 10, convection heat cooking is performed by the heater 302 and the blowing fan 308. The heat generated from the heater 302 is forcedly circulated in the hot air chamber 307 and the cooking chamber 301. During the circulation, the heat is transferred to foodstuff in the cooking chamber 301, making cooking possible. Simultaneously, the cooling fan 308*a* is rotated and the motor 308*b* is cooled by the outside air.

However, since the heater, the duct having the thick heat resistance material, the blowing fan, the cooling fan and the motor are mounted between the rear plate 304*a* of the inner case and the rear plate 306*a* of the outer case, a relatively large space between the rear plates is required. That causes the problem of an increase of the whole volume of the oven.

Further, when components are out of order, the rear plate must be detached in order to replace the components, causing much complication.

Furthermore, an inlet and outlet formed on the rear plate 304*a* are arranged close to each other, which disturbs the airstream. That causes a decrease of effective air volume in the cooking chamber and uneven distribution of the hot air in the cooking chamber, resulting in a heating ineffectiveness problem.

Also, the duct 307*a* is provided at an ineffective place and the airstream can not be guided effectively, thus producing difficulty in achieving even and fast cooking.

SUMMARY OF THE INVENTION

An object of the present invention is to provide a convection microwave oven for enabling the airstream to be fed effectively and increasing the effective volume of the air, thus allowing more even cooking.

Another object of the present invention is to provide a convection microwave oven suitable for quicker and faster cooking by developing a faster airstream.

Another object of the present invention is to provide a convection microwave oven for preventing turbulence of the hot air by improving the configuration arrangement of both the outlet and inlet, resulting in a more active airstream and the increase of cooking efficiency.

Another object of the present invention is to provide a convection microwave oven that achieves compactness and simplicity, even though the oven is equipped with a grill and a heat convection cooking function in addition to a microwave cooking function.

According to one aspect of the present invention a convection microwave oven is comprised of a body, a cooking chamber housed in the body, a fan rotatably mounted between the body and the cooling chamber for circulating the air in the cooking chamber, an inlet provided on a wall of the cooking chamber for drawing the air in the cooking chamber into the fan, an outlet provided on a wall of the cooking chamber for blowing the air via the fan toward a heater arranged in the cooking chamber.

Preferably, the fan is disposed adjacent to the inlet.

Preferably, the inlet is disposed on a lower or an upper portion of the wall of the cooking chamber and the outlet is disposed on an upper or a lower portion of the wall of the cooking chamber.

Preferably, a duct is further comprised, the fan is housed in the duct and one of the ducts is directed to the inlet and another thereof is directed to the outlet.

DESCRIPTION OF THE PREFERRED EMBODIMENTS

Figure 1:
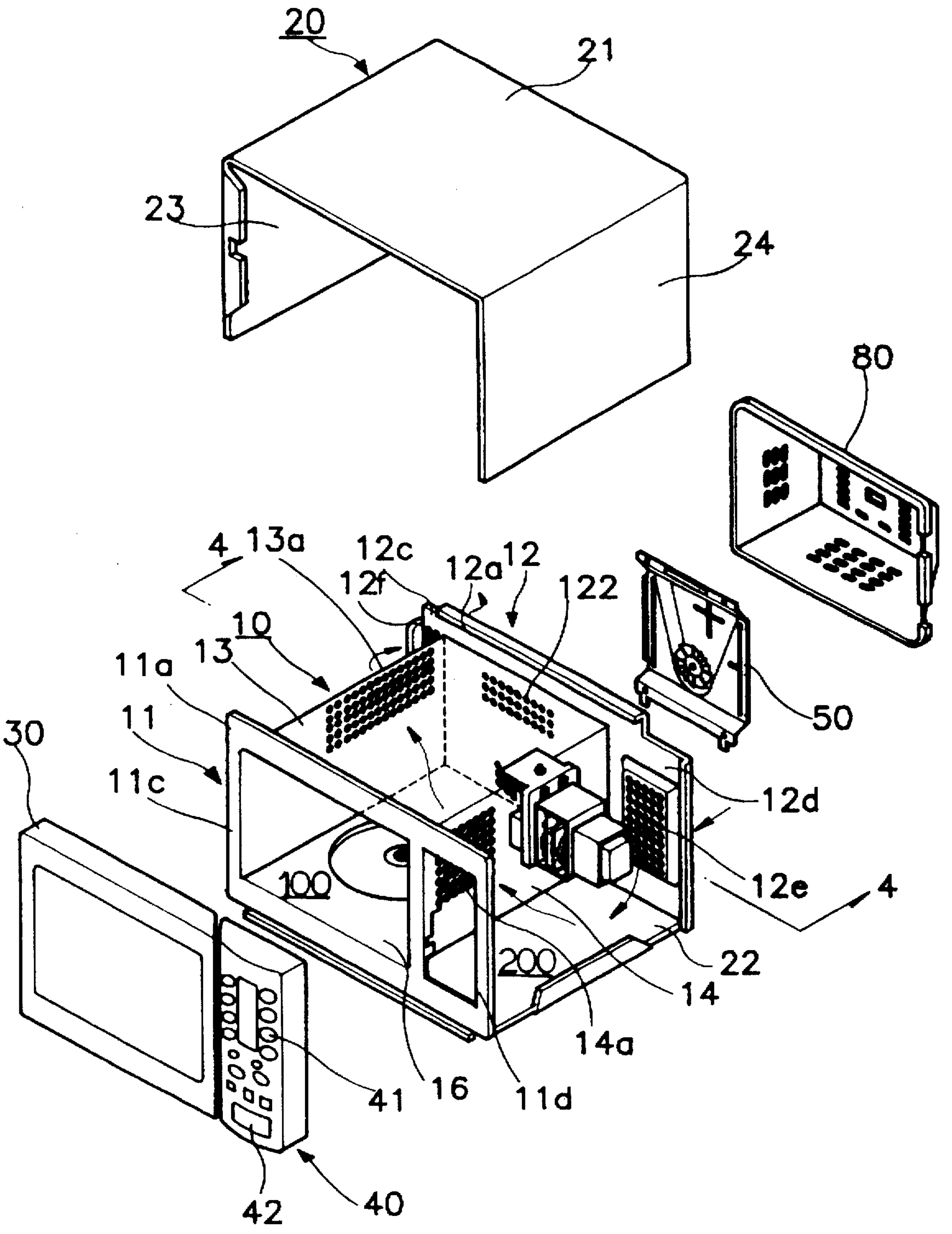
FIG. 1 is a perspective exploded view of a convection microwave oven according to the present invention.

In FIG. 1, a convection microwave oven is comprised of an inner case 10, an outer case 20 and various electrical components placed between the inner case 10 and the outer case 20. At the rear of case 10,20 a duct assembly 50 and a shielder 80 are detachably mounted. The inner case 10 is comprised of a front plate 11, a rear plate 12, a left plate 13, a right plate 14, a top plate 15 (see FIG. 2) and a bottom plate 16, thereby defining a cooking chamber 100. The front plate 11 has an opening utilized as an inlet of the cooking chamber 100. The front plate 11 is extended in length and width directions with a predetermined length, having an upper plate **11*a*, and left and right plates, 11*c* and 11*d*, respectively. The rear plate 12, facing the front plate 11, is comprised of an upper plate 12*a*, left and right plates, 12*c* and 12*d***, respectively, which are extended in length and width directions.

The outer case 20 is comprised of a top plate 21, a bottom plate 22, a left plate 23 and a right plate 24. Each edge of the plates of the outer case 20 borders the corresponding edge of one of the plates **11*a*,11*c*,11*d*,12*a*,12*c*,12*d* of the front and rear plates 11,12, thereby forming the body of the microwave oven. The front-to-rear length of each plate of the outer case 20 is the same as that of each plate of the inner case 10. The longitudinal or sideways length of the top plate 21 is the same as that of the front or rear plate 11,12. Since the rear plate 12 of the inner case 10 also serves as the rear plate of the outer case 20**, an additional rear plate for the outer case is no longer needed.

A door 30 is hinged at the front plate 11 of the inner case 10 to close or open the cooking chamber 100. At the right plate **11*d* a control box 40 having a display portion 41 and a button 42 is placed flush with the door 30. The space defined by the right plate 14 of the inner case 11, the right plate 24 of the outer case 20, the right plate lid of the front plate 11 and the right plate 12*d* of the rear plate 12, forms an electrical component chamber 200**.

To cool the air in the electrical component chamber 200 and get rid of humidity and odor in the cooking chamber 100, a plurality of inlets **12*e*,14*a* are provided in the right plate 12*d* and the right plate 14, respectively. Further, a plurality of outlets 13*a*,12*f* are provided in the left plates 12*c*, 13 respectively. With the operation of the cooling fan which will be described later, the outside air is drawn into the electrical component chamber 200 and the cooking chamber 100 through the inlets 12*e*,14*a*, respectively and is blown out through the outlets 13*a*,12*f***.

Figure 2:
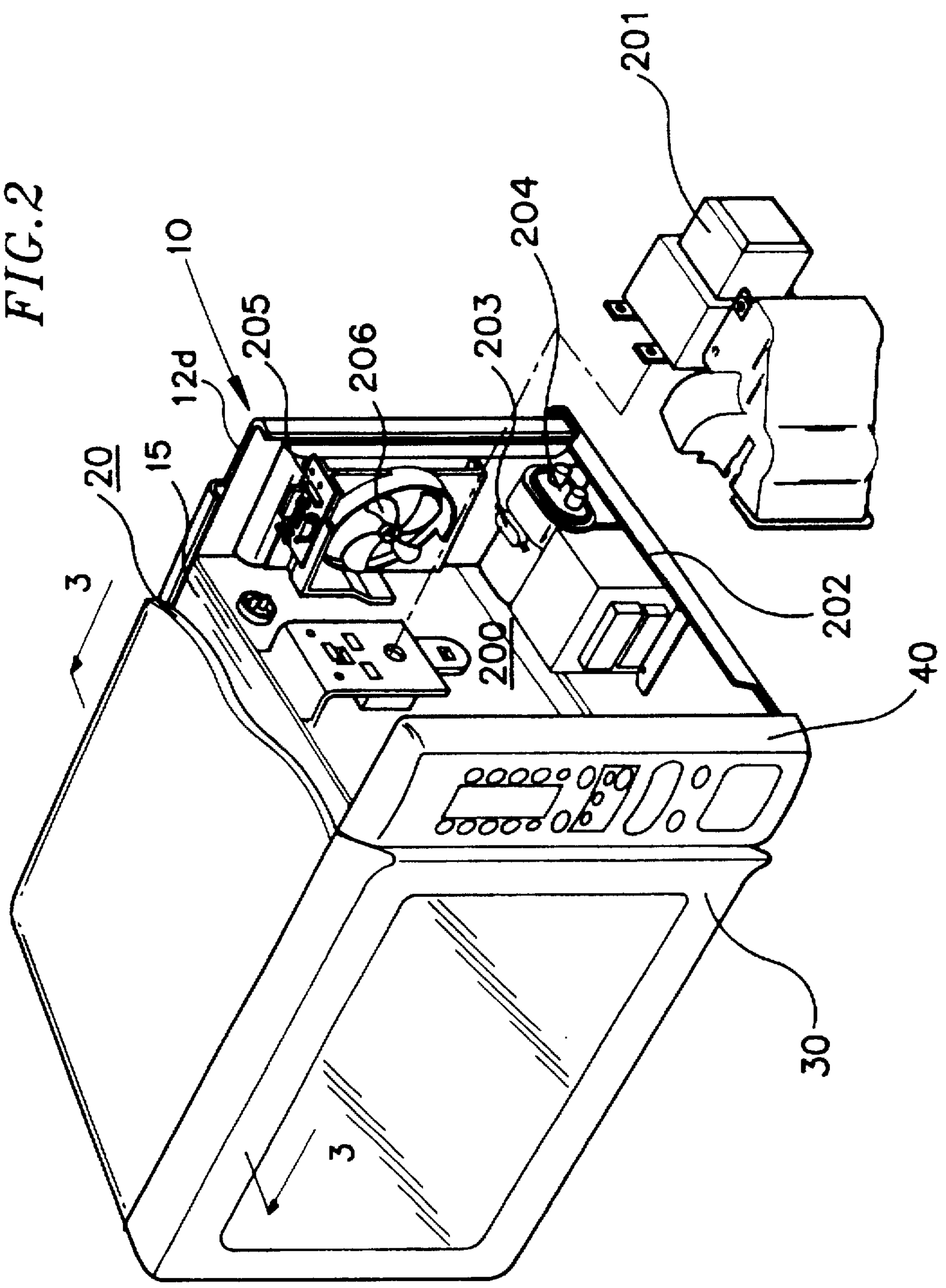
FIG. 2 is a partially broken perspective view of a convection microwave oven according to the present invention.

The electrical component chamber 200, as shown in FIG. 2, has a magnetron 201 as a microwave emitting means. A high voltage transformer 202 for supplying the high voltage to the magnetron 201, a high voltage diode 203, a high voltage capacitor 204 and a choke circuit board 205 serving as a control unit are provided in the electrical components chamber 200. To cool off the heat generated by the operation of the electrical components, a cooling fan 206 is mounted on the inside surface of the right plate **12*d***.

Figure 3:
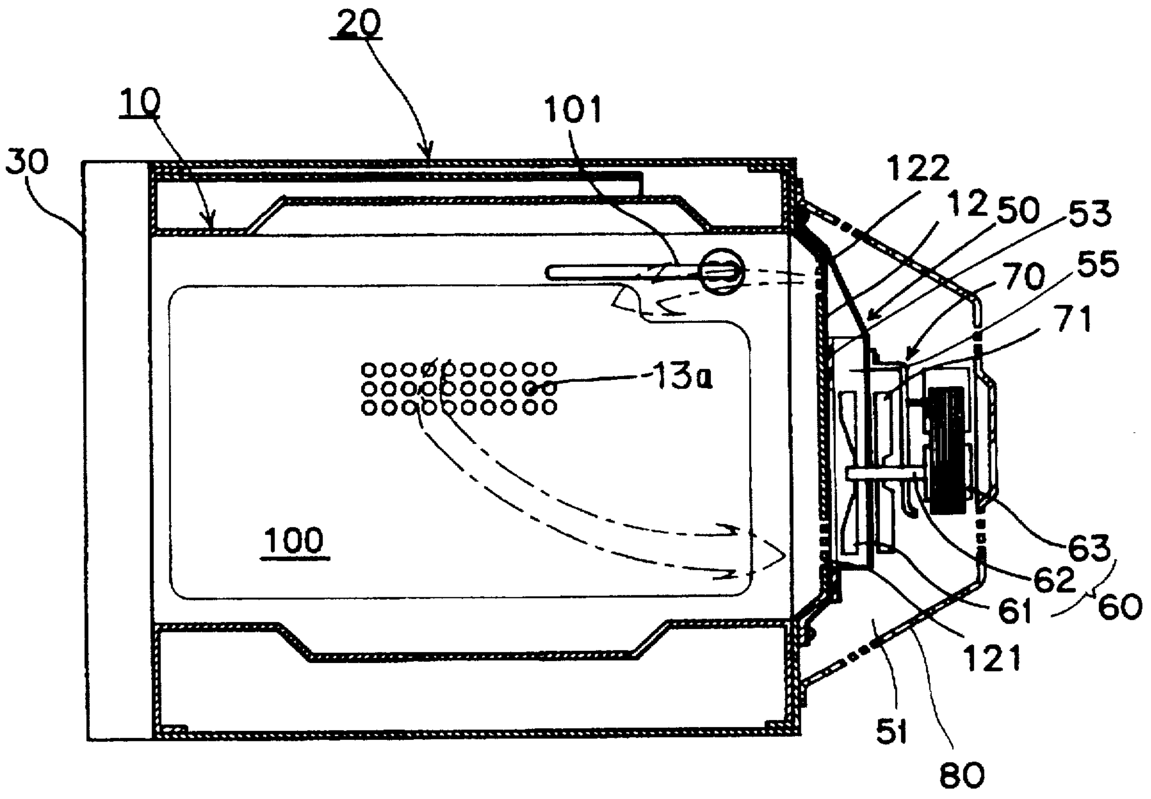
FIG. 3 is a sectional view taken along the line 3—3 of FIG. 2.

In FIG. 3, a heater 101, which is energized by electricity supplied from the high voltage transformer 202, is rotatably mounted in the cooking chamber 100. The duct 50 is mounted on the rear plate 12 having openings 121,122. The openings 121,122 are used as the inlet and outlet for the forced circulation of hot air. And the openings 121,122 communicate the cooking chamber 100 with a guiding channel 55 formed between the rear plate 12 and the duct 50. A cooling chamber 51 is formed between the duct 50 and the shielder 80. A circulating means 60 and a cooling means 70 are installed in the channel 55 and chamber 51, respectively. The circulating means 60 is comprised of a circulating fan 61 mounted on one end of a rotating shaft 62 extending through the duct 50, and a motor 63 installed at the other end thereof. The cooling means 70 is comprised of a cooling fan 71 mounted on the shaft 62 in the chamber 56.

Figure 4:
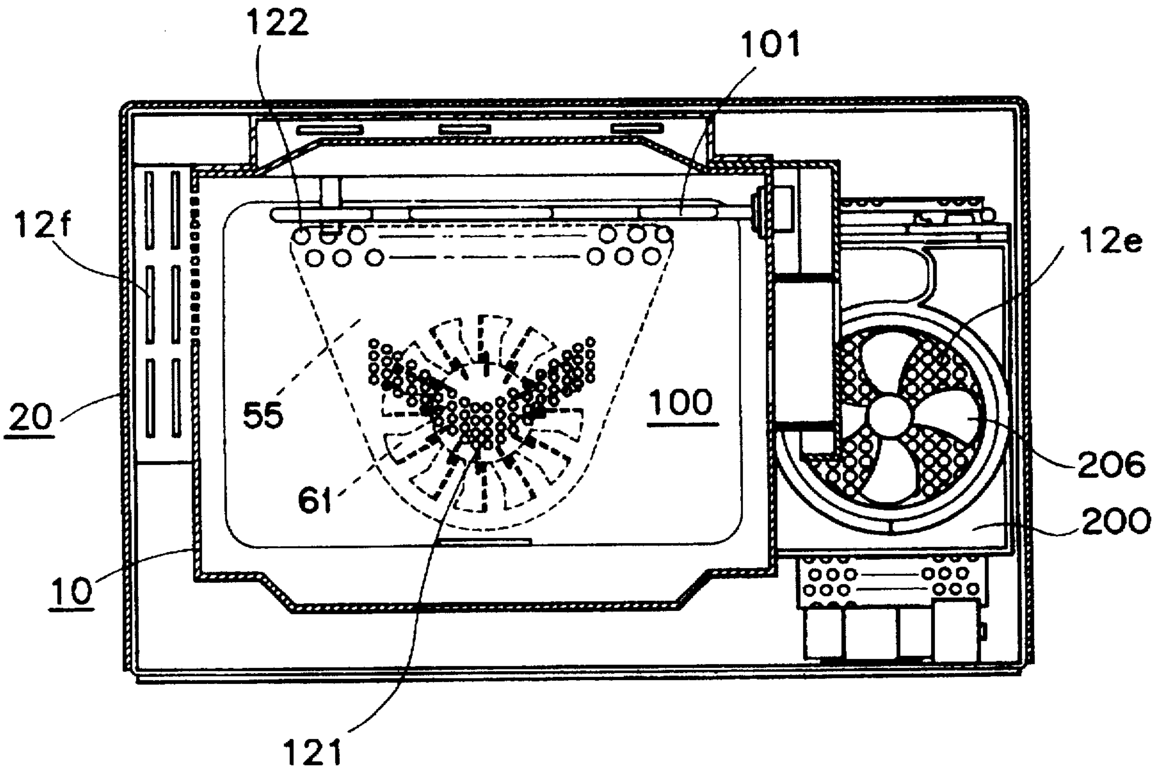
FIG. 4 is a sectional view taken along the line 4—4 of FIG. 1.

The inlet 121 is formed at the lower portion of the rear plate 12, whilst the outlet 122 is formed at the upper portion of the rear plate 12 as shown in FIG. 4. The inlet 121 and the outlet 122 comprise small size openings for preventing microwaves from passing through the inlet 121 or outlet 122. The inlet 121 is spaced apart from the outlet 122 at a predetermined distance. The flow of the air through from the outlet 122 can not be mixed with the flow of the air through toward the inlet 121. The circulating fan 61 is placed facing the inlet 121. The inlet 121 presents a V or U configuration (see FIG. 4) to make a corresponding shape with a lower portion **55*a* of the guiding channel 55 of the duct 50 as will become apparent. Therefore, the air passing through the inlet 121 is guided toward the outlet 122 more effectively. It is desirable that the outlet 122 has a length the same as the longitudinal length of the heater 101 (see FIG. 4) so as to diffuse the air toward the cooking chamber 100** in a proper manner.

Figure 5:
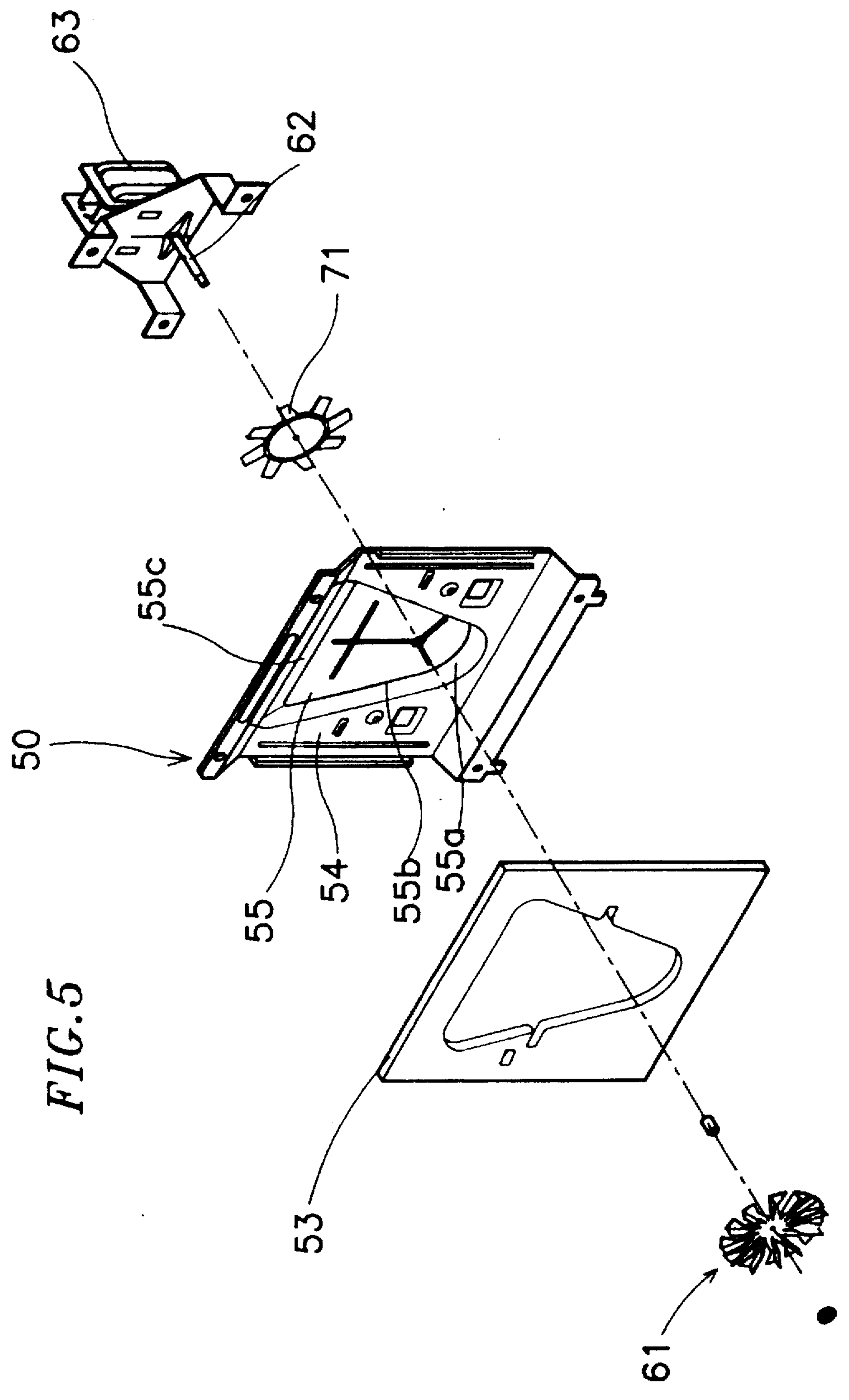
FIG. 5 is a perspective exploded view of a duct and a convection means according to the present invention.

In FIG. 5, the duct 50 is shown as comprised of a flange 54 tightly attached to the rear plate 12 (FIG. 3) with a platelike heat-resist material 53 interposed therebetween. The guiding channel 55 has such a shape that the air drawn in through the inlet 121 by the circulating fan 61 is directed upward and through the outlet 122 (FIG. 3). That is, the guiding channel 55 is comprised of a lower intake guide portion **55*a* having a larger diameter than that of the circulating fan 61 for housing the fan 61, a widening portion 55*b* steadily expanding from the intake guide portion 55*a* to a blow-out guide portion 55*c* formed above the widening portion 55*b*. The intake guide portion 55*a* is shaped as a semi-circle forming a narrow gap with the rim of the circulating fan 61. The width of widening portion 55*b* is steadily expanded as the widening portion approaches the blow-out portion 55*c*. The longitudinal length of the blow-out portion 55*c* is approximately the same as that of the outlet 122. The intaken air according to the rotation of the fan 61 is diffused as it travels upwardly in the channel 55, and is discharged through the outlet 122 (FIG. 3), thereby diffusing the heat generated by the heater 101** and evenly transmitting the heat to foodstuff so as to cook it thoroughly.

Figure 6:
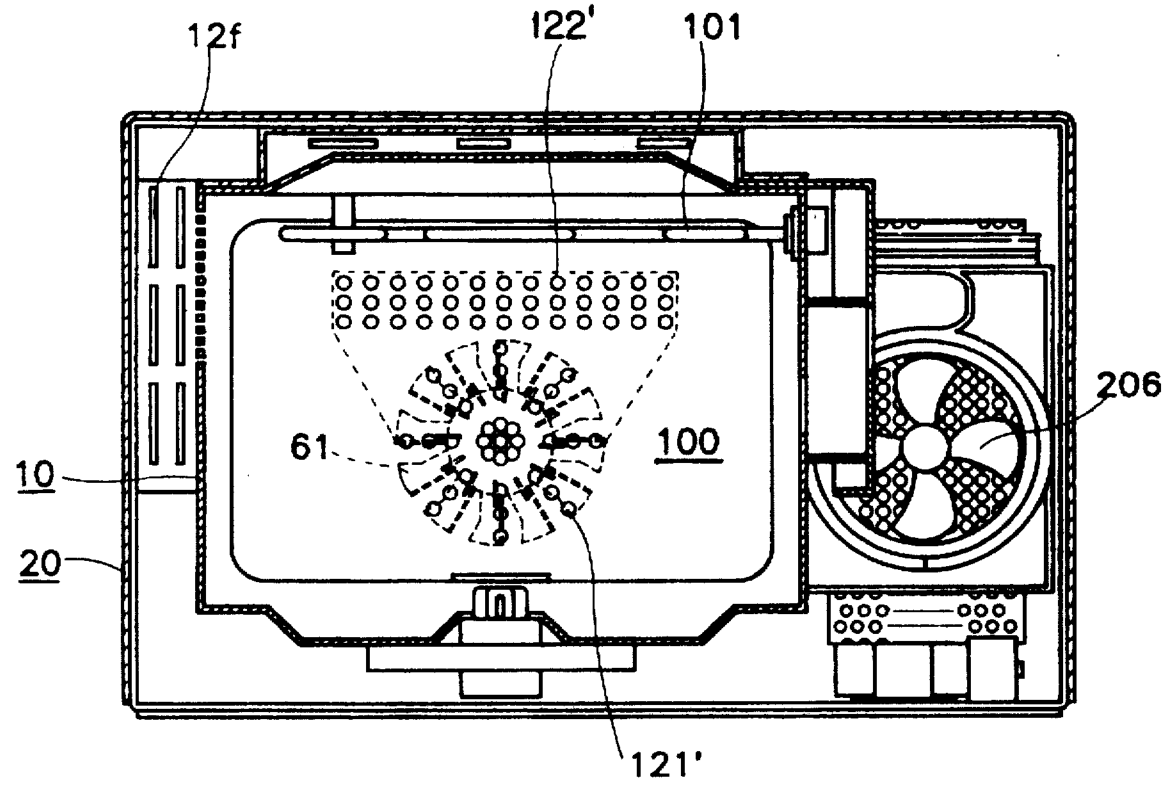
FIG. 6 is similar to FIG. 4, depicting another embodiment of an inlet and an outlet.
Figure 7:
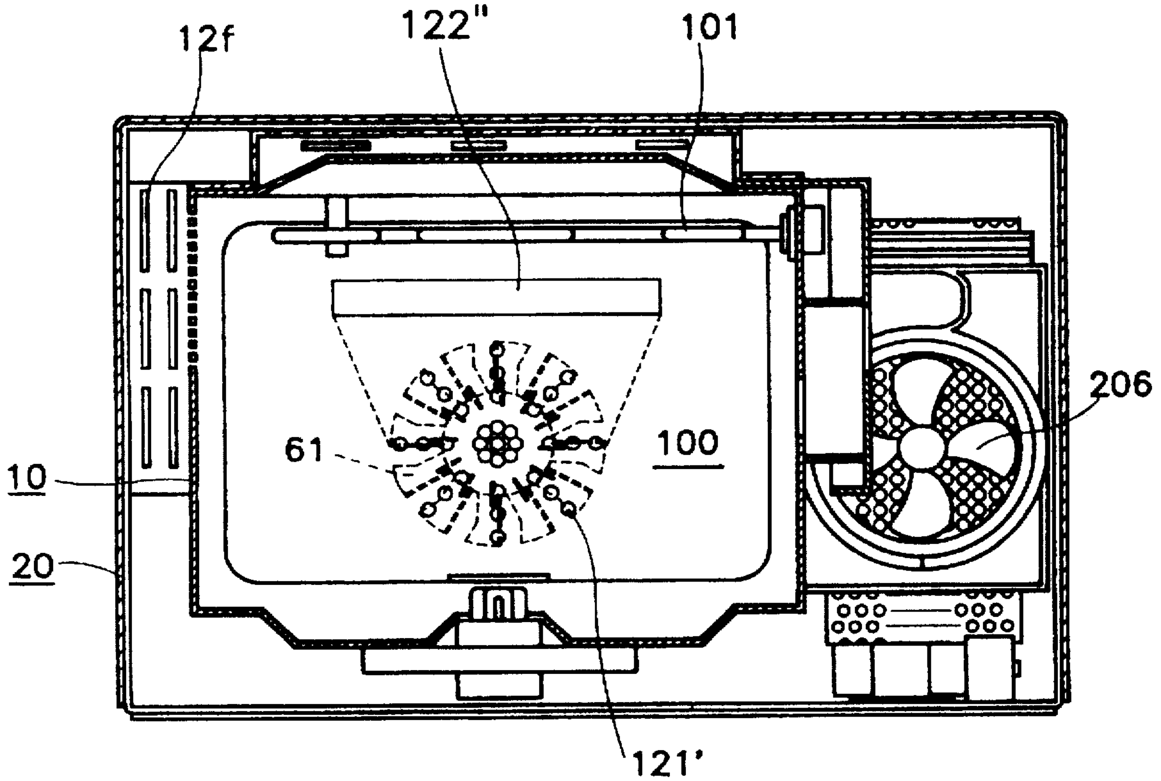
FIG. 7 is similar to FIG. 4, depicting yet another embodiment of an inlet and an outlet.

FIGS. 6 and 7 illustrate modifying embodiments of an inlet and an outlet utilized as an intercommunicating means between the cooking chamber and the duct. FIG. 6 shows an inlet 121' defined by radially extending openings, with the rows arranged in a circular pattern about a central cluster of openings. The center of the circle is generally aligned with an axis of the fan 61. The outlet 122 comprises three horizontal rows of openings, the rows arranged in vertically spaced relationship. FIG. 7 shows the inlet like in FIG. 6 except that the outlet 122" formed as a larger single opening or slot.

Figure 8:
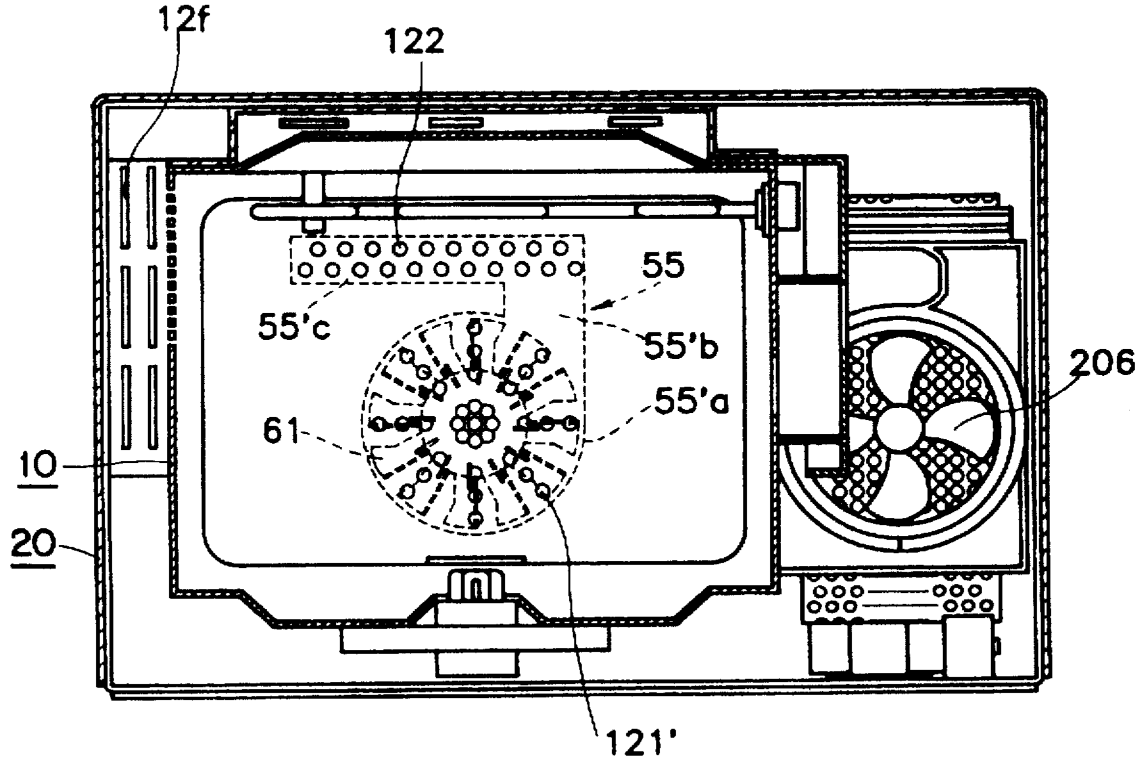
FIG. 8 is similar to FIG. 4, depicting still one more another embodiment of guiding groove of a duct.
Figure 9:
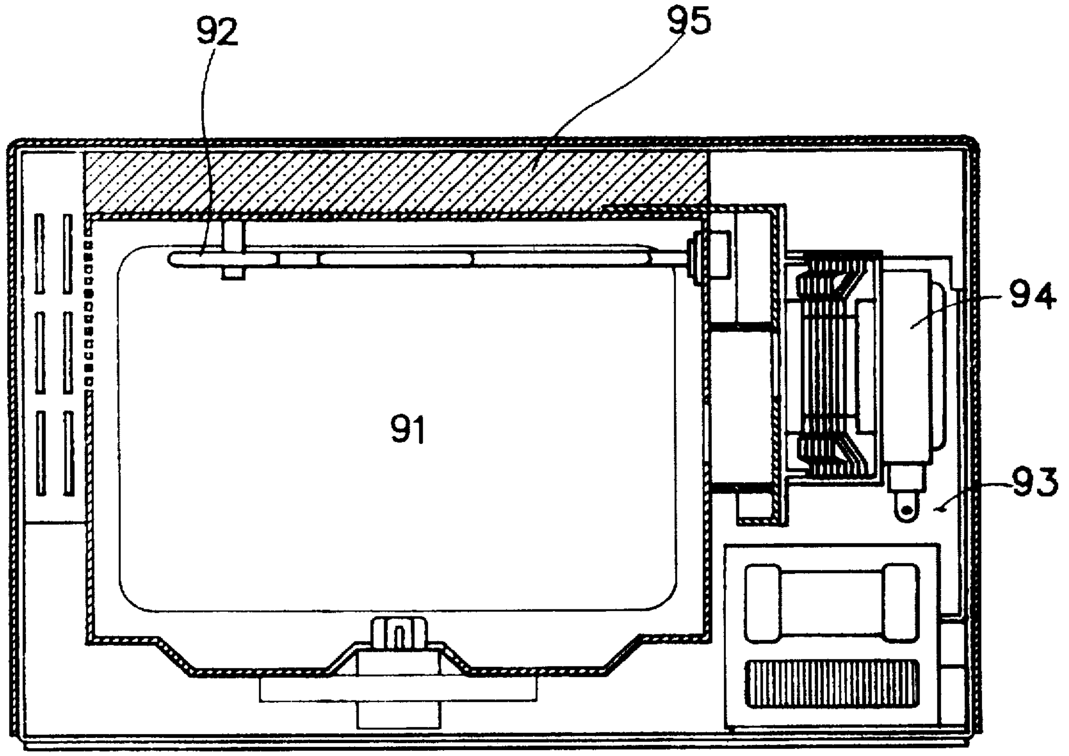
FIG. 9 (Prior Art)
FIG. 9 is a front sectional view of a convection microwave oven according to the prior art.
Figure 10:
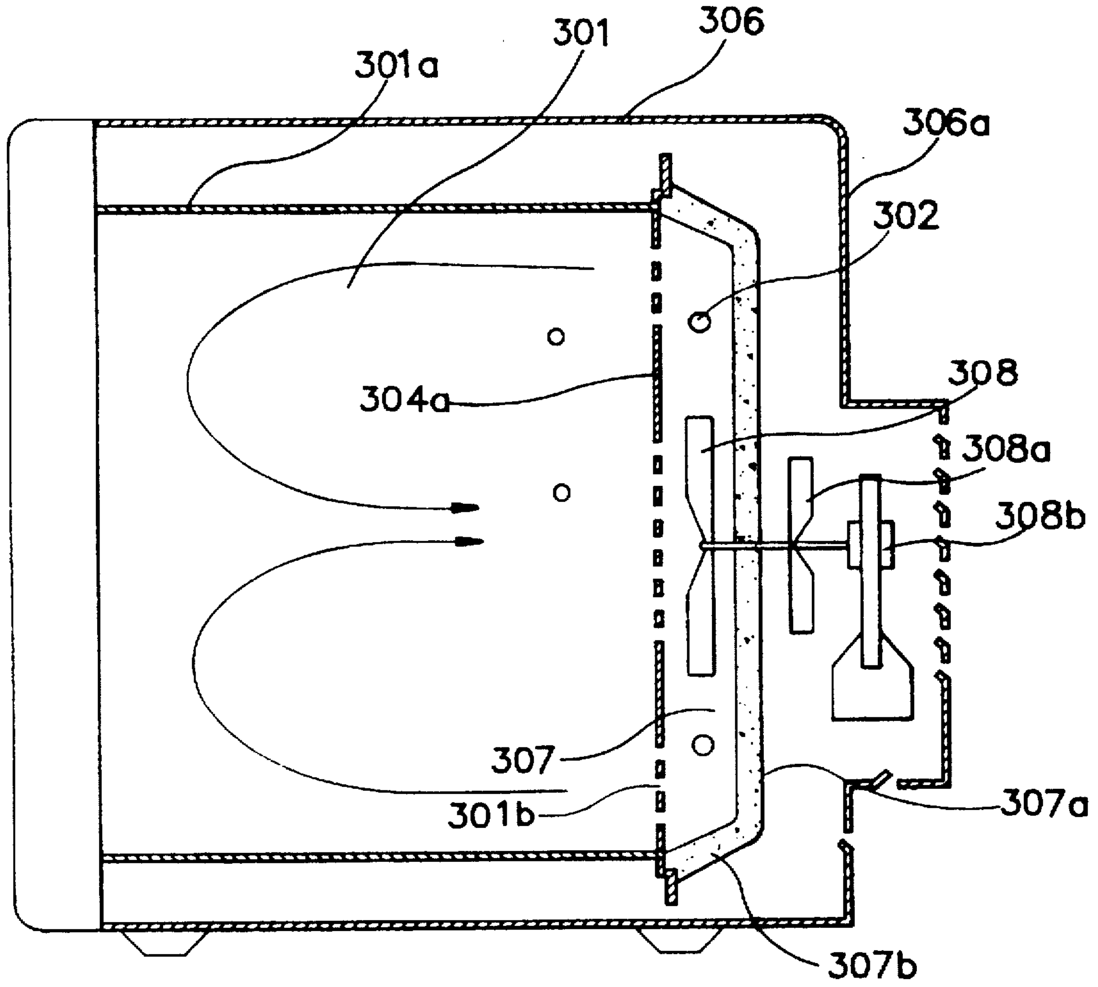
FIG. 10 (Prior Art)
FIG. 10 is a side sectional view of a convection microwave oven according to a different prior art.

FIG. 8 depicts another embodiment of a guiding channel 55' comprised of an intake guide portion 55'*a* a larger diameter than that of the circulating fan 61 for housing the fan 61, an accelerating portion 55'*b* having a smaller width than the diameter of the fan and a blow-out guide portion 55'*c* formed above the widening portion 55'*b*. The above configurated guiding channel 55' has an advantage in that the air accelerates as it passes through the narrow portion 55'*b* and thus cooking time decreases.

The microwave oven is operated as follows:

Firstly, when in the microwave cooking mode, a start button is pressed and the outside air is drawn into the cooking chamber 100 by the operation of the cooling fan 206 so as to get rid of humidity in the cooking chamber 100. When the fan 20*b* is rotated, the outside air is directed into the electrical components chamber 200 through the inlet 12*e* in the direction of arrows as shown in FIG. 1 to cool the magnetron 201 and the high voltage transformer 202. Next, the air is fed into the cooking chamber 100 through the inlet 14*a* formed in the right plate 14. Finally, the air and accompanying moisture is discharged to the outside through the outlet 13*a* formed at the left plate 13 and the outlet 12*f* formed at the left plate 12*c*. Simultaneously, electricity is supplied to the primary winding of the higher voltage transformer 202 and the higher voltage of an alternating current, i.e. 2,230 V is generated at the secondary winding to be changed into the direct current by the higher voltage diode 203 and the higher voltage capacitor 204. The direct current is supplied to the magnetron 201 to generate microwaves, thus thoroughly cooking the foodstuff.

When in the forced air convection cooking mode, electricity is supplied to the heater 101 so as to generate heat, and the fan 61 is rotated, simultaneously. With the rotation of the fan 61, the air in the cooking chamber 100 is drawn into the duct 50 through the inlet 121 and is directed up along the guiding channel 55 and finally is discharged to the cooking chamber 100 through the outlet 122 (FIGS. 3 and 5). The discharged air convects the heat generated from the heater 101, achieving the cooking of foodstuff. More concretely, The fan 61 rotates and the air in the cooking chamber 100 is drawn into the intake guide portion 55*a*. The drawn airstream is expanded while passing through the widening portion 55*b* and is directed upward. The rising-airstream passes the blow-out guide portion 55*c* and is discharged into the cooking chamber through the outlet 122 formed in a horizontal manner. The air passes the heater 101 shaped in a manner generally corresponding to the shape of the outlet 122 and receives sufficient heat from the heater 101. After the convective circulation takes place in the cooking chamber 100 as shown in FIG. 3, the air is fed back to the inlet 121. Since the inlet 121 is distanced from the outlet 122, the airstream directed toward the inlet 121 has little collision with the airstream discharged from the outlet 122 and is smoothly drawn into the duct 50 through the inlet 121. The above circulation takes place continually.

Furthermore, in the case that the guiding channel 55' is configurated as shown in FIG. 8, the air drawn into the intake guide portion 55'*a* is accelerated along the widening portion 55'*b*. The speedy air is discharged to the cooking chamber 100 through the blow-out guide portion 55'*c*, causing the advantage of faster cooking. The cooling fan 71 rotates simultaneously so as to cool the motor 63. The convection cooking can be performed alone or with the microwave cooking.

The convection microwave oven of the present invention has the following advantages.

By improving the configuration of the duct and the arrangement of the inlet and outlet, no turbulent airstream can take place and the volume of the convention is increased with the active flow of the hot air, causing the efficiency of the cooking to be increased and enabling thorough cooking. Further, faster cooking is possible due to the faster flow of the air.

Even though this microwave oven is provided with a grill cooking function, a forced convection cooking function as well as a microwave cooking function, compactness and simplicity of the oven can be achieved. Since the heater is installed in the cooking chamber, the present invention is simpler than the prior art having an electrical heater and thin thermal-resistance converings mounted on the exterior of a cooking chamber.

What is claimed is:

1. A convection microwave oven, comprising:
   - a cooking chamber defined by a wall structure:
   - a high frequency generating mechanism for supplying high frequency waves to said cooking chamber for performing microwave cooking;
   - an electric heater disposed within said cooking chamber for performing convection cooking;
   - a channel disposed outside of said cooking chamber and communicating with said cooking chamber by an air inlet and an air outlet formed in said wall structure; and
   - an air blower disposed in said channel for drawing-in air from said cooking chamber through said air inlet, and discharging the air back into said cooking chamber through said air outlet;
   - wherein said air outlet is positioned to direct the discharged air toward said electric heater; and
   - wherein the cross-sectional area of the channel becomes wider from the air inlet to the air outlet.

2. The convection microwave oven according to claim 1, wherein said air blower is situated adjacent said air inlet.

3. The convection microwave oven according to claim 1 wherein one of said air inlet and air outlet is situated adjacent an upper portion of said cooking chamber, and the other of said air inlet and air outlet is situated adjacent a lower portion of said cooking chamber.

4. The convection microwave oven according to claim 3 wherein said air inlet is situated adjacent said lower portion of said cooking chamber.

5. The convection microwave oven according to claim 4 wherein said wall structure includes a top wall, said electric heater mounted on an underside of said top wall.

6. The convection microwave oven according to claim 1 wherein said wall structure includes a plurality of vertical walls, said air inlet and air outlet both formed in the same one of said vertical walls.

7. The convection microwave oven according to claim 6 wherein said one vertical wall comprises a rear wall of said cooking chamber.

8. The convection microwave oven according to claim 1, further including an outer body, said wall structure housed within said outer body.

9. The convection microwave oven according to claim 1, wherein air flow through the channel is unidirectional.

10. A convection microwave oven, comprising:

a cooking chamber defined by a wall structure;

a high frequency generating mechanism for supplying high frequency waves to said cooking chamber for performing microwave cooking;

an electric heater disposed within said cooking chamber for performing convection cooking;

a channel disposed outside of said cooking chamber and communicating with said cooking chamber by an air inlet and an air outlet formed in said wall structure; and an air blower disposed in said channel for drawing-in air from said cooking chamber through said air inlet, and discharging the air back into said cooking chamber through said air outlet;

wherein said air outlet is positioned to direct the discharged air toward said electric heater; and wherein the cross-sectional area of the channel becomes narrower from said air inlet to said air outlet for increasing the speed of the air.

11. The convection microwave oven according to claim 10, wherein said air blower is situated adjacent said air inlet.

12. The convection microwave oven according to claim 10 wherein one of said air inlet and air outlet is situated adjacent an upper portion of said cooking chamber, and the other of said air inlet and air outlet is situated adjacent a lower portion of said cooking chamber.

13. The convection microwave oven according to claim 12 wherein said air inlet is situated adjacent said lower portion of said cooking chamber.

14. The convection microwave oven according to claim 13 wherein said wall structure includes a top wall, said electric heater mounted on an underside of said top wall.

15. The convection microwave oven according to claim 10 wherein said wall structure includes a plurality of vertical walls, said air inlet and air outlet both formed in the same one of said vertical walls.

16. The convection microwave oven according to claim 15 wherein said one vertical wall comprises a rear wall of said cooking chamber.

17. The convection microwave oven according to claim 10, further including an outer body, said wall structure housed within said outer body.

18. The convection microwave oven according to claim 10, wherein air flow through the channel is unidirectional.

* * * * *